Patented Oct. 27, 1925.

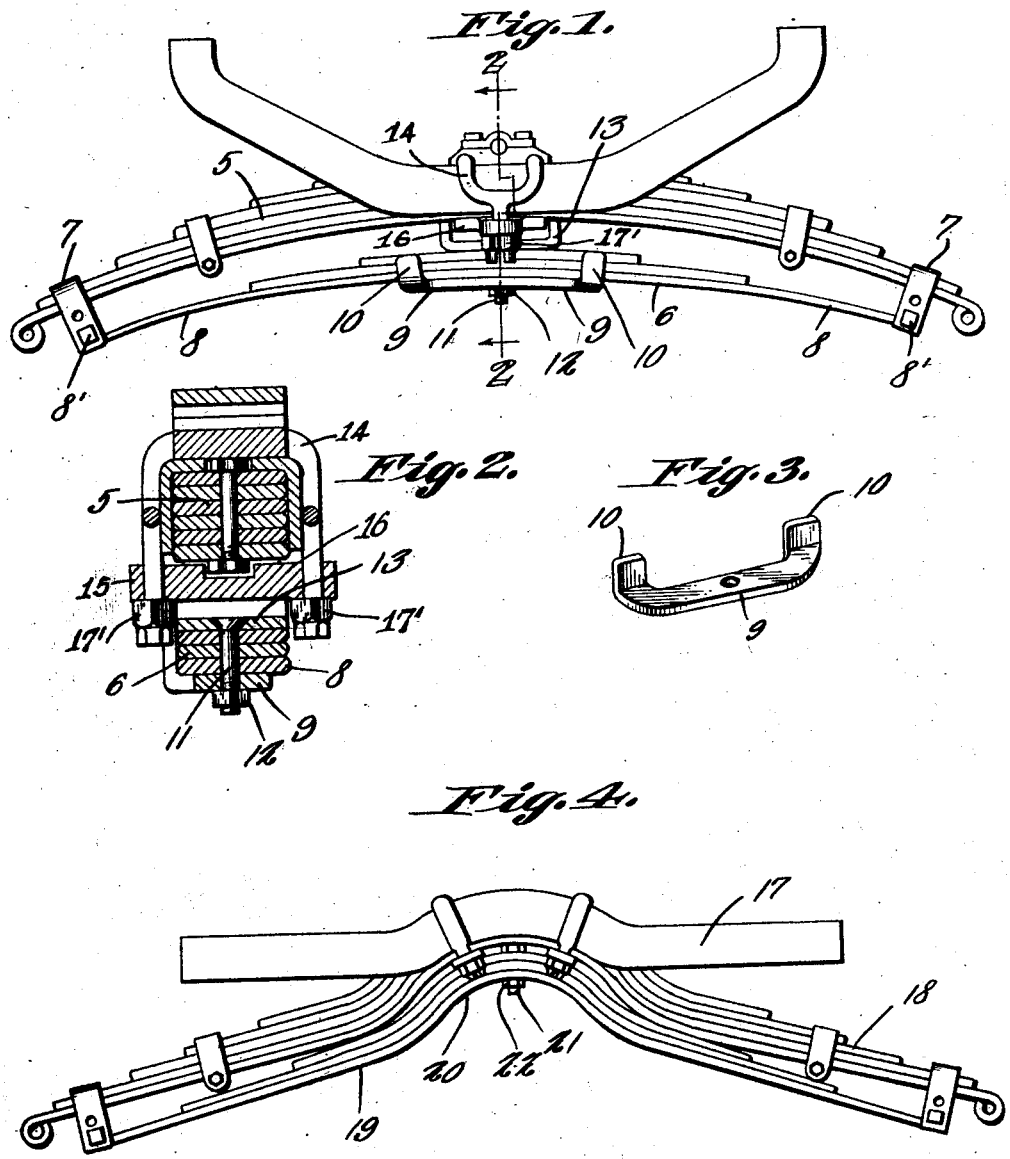

1,559,353

UNITED STATES PATENT OFFICE.

ISOM JERRY NOBLE, OF HIGGINSON, ARKANSAS.

VEHICLE SPRING.

Application filed October 6, 1924. Serial No. 742,042.

*To all whom it may concern:*

Be it known that I, ISOM JERRY NOBLE, a citizen of the United States, residing at Higginson, in the county of White and State of Arkansas, have invented new and useful Improvements in Vehicle Springs, of which the following is a specification.

My invention relates to vehicle springs and its principal object is to provide a spring or shock absorbing attachment for use on the conventional front or rear spring of light automobile such as the Ford type.

A further object of the invention is to provide a spring attachment for vehicle springs which will reinforce the latter and reduces the liability of a broken spring to a minimum as well as insuring safety and increasing the life of the vehicle spring.

Another object of the invention is to provide a reinforcing or strengthening shock absorbing attachment which may be readily associated with vehicle springs of various types and can be readily installed on the same without altering or changing the parts thereof.

With the preceding and other objects and advantages in mind, the invention consists in the novel combination of elements, arrangement of parts and operation, to be hereinafter explicitly referred to, claimed and illustrated in the acompanying drawings, wherein:—

Figure 1 is a front elevation of a vehicle spring embodying my invention.

Figure 2 is a fragmentary vertical sectional view taken on line 2—2 of Figure 1.

Figure 3 is a perspective view of one of the elements embodied in the invention, and Figure 4 is an elevation of a slightly modified embodiment of the invention.

Referring in detail to the drawing wherein corresponding characters of reference denote corresponding parts throughout the several views, the numeral 5 designates a conventional spring of an automobile of a well known make.

The invention as reduced to practice consists of a series of spring leaves 6 arranged in opposed relation and disposed directly below the spring 5. The ends of the bottom-most leaf 6 are connected to the spring 5 by means of shackles or clips 7 which embrace the ends of the spring 5 and are connected to this lowermost leaf 8 by transverse bolts 8' passing therethrough and through the ends of the shackles or clips 7.

Underlying the lowermost leaf 6 at the crest thereof is an elongated plate 9 provided with upstanding wings 10 at one edge. These wings 10 extend along the inner edge of the leaves 6 and hold the same against lateral movement in one direction. A bolt 11 passes centrally through the leaves 6 and the plate 9 and receives upon its lower end a nut 12.

Arranged upon the uppermost face of the auxiliary spring is a U-shaped bearing plate 13 whose upper edges contact with the lowermost leaf of the vehicle spring 5. This plate 13 is retained in position by means of the bolt 12 above mentioned.

As shown in Figures 1 and 2, I make use of a conventional means for securing the main spring of the vehicle to the frame. This means comprises a stirrup 14 which is U-shaped transversely and longitudinally. This stirrup straddles the frame member of the automobile and is formed with downwardly extending lugs upon opposite sides which pass through openings 15 in a transversely extending plate 16. Nuts 17' are arranged upon the lower ends of these lugs 14.

In Figure 4 a modification of the invention is illustrated. In this form of the invention the rear frame element of the automobile is designated at 17 and connected therewith is the usual rear spring indicated at 18. In this instance the auxiliary spring is designated at 19 and is connected to the spring 18 in the same manner as in the structure set forth. However, this auxiliary spring 19 is formed with an arcuate portion 20 at its center and passing through the crest of this arcuate portion is a bolt 21 having a nut 22 threaded upon its lower end.

While I have shown and described the preferred embodiment of the invention, it is to be understood that changes in the arrangement of parts may be made and that I am only limited by the appended claims.

What is claimed is:—

1. The combination with a vehicle spring, of an auxiliary spring arranged beneath the same and having its ends operatively connected with the first mentioned spring, a plate secured to the underface of the auxiliary spring and provided with wings at one side thereof which extends along the edges of the leaves of the auxiliary spring, a bolt passing through the auxiliary spring and plate, and a U-shaped member carried by the bolt and interposed between the auxiliary spring and the first mentioned spring.

2. The combination with a vehicle spring, of an auxiliary spring arranged beneath the same, and having its ends operatively connected with the vehicle spring, a bolt passing through the auxiliary spring at its crest, and a U-shaped member carried by the bolt and interposed between the vehicle spring and auxiliary spring and contacting with the same.

In testimony whereof I affix my signature.

ISOM J. NOBLE.